(12) United States Patent
Otero et al.

(10) Patent No.: US 11,048,756 B2
(45) Date of Patent: Jun. 29, 2021

(54) INSERTING DATASETS INTO DATABASE SYSTEMS UTILIZING HIERARCHICAL VALUE LISTS

(71) Applicant: EMC IP Holding Company LLC, Hopkinton, MA (US)

(72) Inventors: Joseph Otero, Overland Park, KS (US); Michelle Zhong, Marietta, GA (US); Brent A. Huscher, Overland Park, KS (US)

(73) Assignee: EMC IP Holding Company LLC, Hopkinton, MA (US)

( * ) Notice: Subject to any disclaimer, the term of this patent is extended or adjusted under 35 U.S.C. 154(b) by 310 days.

(21) Appl. No.: 16/263,655

(22) Filed: Jan. 31, 2019

(65) Prior Publication Data

US 2020/0250233 A1 Aug. 6, 2020

(51) Int. Cl.
```
G06F 16/00      (2019.01)
G06F 16/901     (2019.01)
G06F 16/907     (2019.01)
G06F 16/84      (2019.01)
G06F 16/81      (2019.01)
```
(52) U.S. Cl.
CPC ......... *G06F 16/9027* (2019.01); *G06F 16/81* (2019.01); *G06F 16/84* (2019.01); *G06F 16/907* (2019.01)

(58) Field of Classification Search
CPC .... G06F 16/9027; G06F 16/907; G06F 16/84; G06F 16/81; G06F 16/2246; G06F 16/23
See application file for complete search history.

(56) References Cited

U.S. PATENT DOCUMENTS

| | | | |
|---|---|---|---|
| 6,792,432 B1* | 9/2004 | Kodavalla | ........... G06F 16/2308 |
| 8,788,464 B1 | 7/2014 | Lola et al. | |
| 2004/0015486 A1 | 1/2004 | Liang et al. | |
| 2004/0268238 A1 | 12/2004 | Liu et al. | |

(Continued)

FOREIGN PATENT DOCUMENTS

WO   WO-0225471 A2 *  3/2002  ........... G06F 16/212

OTHER PUBLICATIONS

MySQL Tutorial, "Managing Hierarchical Data in MySQL Using the Adjacency List Model," http://www.mysqltutorial.org/mysql-adjacency-list-tree/, Jan. 28, 2019, 12 pages.

*Primary Examiner* — Diedra McQuitery
(74) *Attorney, Agent, or Firm* — Ryan, Mason & Lewis, LLP (57) ABSTRACT

A method includes obtaining a dataset comprising a plurality of records to be inserted into a database, and converting the dataset into a hierarchical value list, the hierarchical value list comprising a hierarchy with one or more levels. The method also includes generating a plurality of record arrays for the plurality of records to be inserted into the database, a given record array comprising a set of values for a given record at one or more index positions each corresponding to one of the one or more levels of the hierarchy. The method further includes building an index array comprising values for a given one of the index positions of the plurality of record arrays corresponding to a given one of the one or more levels of the hierarchy, and inserting the index array comprising the values for the given level of the hierarchy into the database.

20 Claims, 6 Drawing Sheets

(56) References Cited

U.S. PATENT DOCUMENTS

| | | | |
|---|---|---|---|
| 2007/0073841 A1* | 3/2007 | Ryan | G06Q 30/06 |
| | | | 709/217 |
| 2008/0120280 A1* | 5/2008 | Lijima | G06F 16/81 |
| 2010/0250560 A1* | 9/2010 | Shinjo | G06F 7/32 |
| | | | 707/753 |
| 2015/0032725 A1 | 1/2015 | Barykin et al. | |
| 2016/0232189 A1* | 8/2016 | Finis | G06F 16/2246 |
| 2016/0292445 A1 | 10/2016 | Lindemann | |
| 2019/0362000 A1* | 11/2019 | Lee | G06F 11/3003 |

\* cited by examiner

```
for (int currentGen = 0; currentGen < maxGeneration; currentGen++)
{
    IDictionary<int, IList<string>> duplicateTracker = new Dictionary<int, IList<string>>();
    IList<ValuesListValueContainer> insertValues = new List<ValuesListValueContainer>();
    foreach (ValueBucket missingValue in missingValues)
    {
        if (missingValue.StartPosition > currentGen)
        {
            continue;
        } string[] fullPath = missingValue.ValueParts; // e.g., [US][Kansas][OverlandPark]
        if (fullPath.Length > currentGen)
        {
            int? parentId = null;
            if (currentGen == missingValue.StartPosition)
            {
                parentId = missingValue.StartNodeParentId;
            }

IList<string> nodes;
            int trackIndex = parentId != null ? parentId.Value : -1;
            if (!duplicateTracker.TryGetValue(trackIndex, out nodes))
            {
                nodes = new List<string>();
                duplicateTracker.Add(trackIndex, nodes);
            } string nodeName = fullPath[currentGen].ToLowerInvariant();
            if (!nodes.Contains(nodeName))
            {
                ValuesListValueContainer valuesListValueContainer = CreateValuesListValue(valuesListId,
fullPath[currentGen], parentId);
                insertValues.Add(valuesListValueContainer);

nodes.Add(nodeName);
            }
        }
    }
}
```

```
//Bulk insert values for generation
if (!insertValues.IsCollectionNullOrEmpty())
{
    BulkValuesListValueSaveResult result = m_context.BulkInsertValuesListValues(valuesListId, insertValues);
    if (result.ValidationMessages.IsCollectionNullOrEmpty() &&
    !result.ValuesListValueDataContainers.IsCollectionNullOrEmpty())
    {
        if (currentGen < maxGeneration - 1)
        {
            //Update
            foreach (ValuesListValueDataContainer insertedValue in result.ValuesListValueDataContainers)
            {
                foreach (ValueBucket missingValue in missingValues)
                {
                    if (missingValue.StartPosition < missingValue.ValueParts.Length - 1 &&
                    missingValue.StartNodeParentId == insertedValue.ValuesListValueParentId &&
                    insertedValue.ValuesListValueName == missingValue.ValueParts[currentGen])
                    {
                        missingValue.StartNodeParentId = insertedValue.ValuesListValueId;
                        missingValue.StartPosition++;
                    }
                }
            }
        }
    }
    else
    {
        string msg = "Error adding values list values for generation " + currentGen;
        m_context.Context.LogDataWithValidation(TraceEventType.Warning, msg, new List<ValidationMessage>(result.ValidationMessages));
    }
}
```

INSERTING DATASETS INTO DATABASE SYSTEMS UTILIZING HIERARCHICAL VALUE LISTS

FIELD

The field relates generally to information processing, and more particularly to techniques for database processing.

BACKGROUND

Database systems store datasets in one or more databases. For a dataset comprising a plurality of records wherein multiple records use the same set of values for one or more fields, a value list may be used. The value list may provide a set of possible values for such fields. When inserting records of a dataset into a database utilizing a value list, each value to be inserted is searched to see if it is present in the database, whereby its associated name and identifier are returned. Missing values are inserted by assigning new identifiers, and the newly-associated identifier and name are returned.

SUMMARY

Illustrative embodiments of the present invention provide techniques for inserting datasets into databases utilizing hierarchical value lists. Some embodiments advantageously reduce the complexity of ingesting large datasets into databases by processing each level or generation of a hierarchy of the hierarchical value list one at a time.

In one embodiment, a method comprises obtaining a dataset comprising a plurality of records to be inserted into a database system and converting the dataset into a hierarchical value list, the hierarchical value list comprising a hierarchy with one or more levels. The method also comprises generating a plurality of record arrays for the plurality of records to be inserted into the database, a given one of the plurality of record arrays comprising a set of values for a given one of the plurality of records at one or more index positions each corresponding to one of the one or more levels of the hierarchy. The method further comprises building an index array comprising values for a given one of the index positions of the plurality of record arrays corresponding to a given one of the one or more levels of the hierarchy, and inserting the index array comprising the values for the given level of the hierarchy into the database system. The method is performed by at least one processing device comprising a processor coupled to a memory.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

A hierarchical value list includes sets of values that are used to classify or categorize a piece of content in one or more ways. A hierarchical value list may have just one level (e.g., a list of primary colors), or may be a multi-level tree structure (e.g., a list of geographical addresses each including a city, county, state or province, country, etc.).

Loading large datasets into database systems can be computationally costly and time consuming, including where the dataset may be characterized as a hierarchical value list. In some cases, this is due to the resources required to perform some level of transformation of the content of the data into the hierarchical value list. In the RSA Archer® Governance, Risk and Compliance (GRC) system, for example, loading and transforming datasets may be accomplished through the use of data feeds. A computationally costly part of this process is the two-fold transformation to load and then associate values of the hierarchical value list to the incoming content of the data feed. Further, loading may be slow when the hierarchical value list includes a large tree structure.

Illustrative embodiments provide techniques for optimization of the ingestion or loading of large datasets into database systems utilizing hierarchical value lists. In some embodiments, the incoming content of the dataset (e.g., a plurality of records) is processed to build the hierarchical value list as a set of in-memory index arrays each corresponding to an index position of values in the plurality of records of the dataset. Using the in-memory index arrays, the hierarchical value list is inserted into the database system one level at a time, rather than one record at a time, thus greatly reducing the number of steps and operations required, which in turn reduces the time and computational resources required for ingestion of the dataset into the database system. Thus, some embodiments optimize the loading and navigation of hierarchical value lists before assigning value identifiers from the database system to incoming content. By pre-processing the incoming data into the set of in-memory index arrays corresponding to respective "levels" or "generations" of the tree structure of the hierarchical value list, each level or generation may be sent to the database system one at a time.

Conventional approaches for the ingestion or insertion of hierarchical value lists may process records one at a time. For each record, its values are looked up in the database system to see if they exist or not. If the value exist, its identifier is returned. If the value does not exist, it is created in the database system, assigned an identifier, and the newly-assigned identifier is returned. As will be described in further detail below, this can be a time-consuming and resource-intensive process. For each node or value in the tree, its associated parent identifier or other ancestors should be known prior to determining if that value exists in the database system. Thus, processing a large number of records requires constantly traversing up and down the tree structure or hierarchy of the hierarchical value list.

In some embodiments, the conventional approach for record-by-record ingestion of hierarchical value lists is replaced with more efficient processes that insert entire levels or generations of the hierarchical value list into the database system at one time. Advantageously, this allows for scaling to ingest large datasets without the need to keep the entire tree structure in memory.

Figure 1:
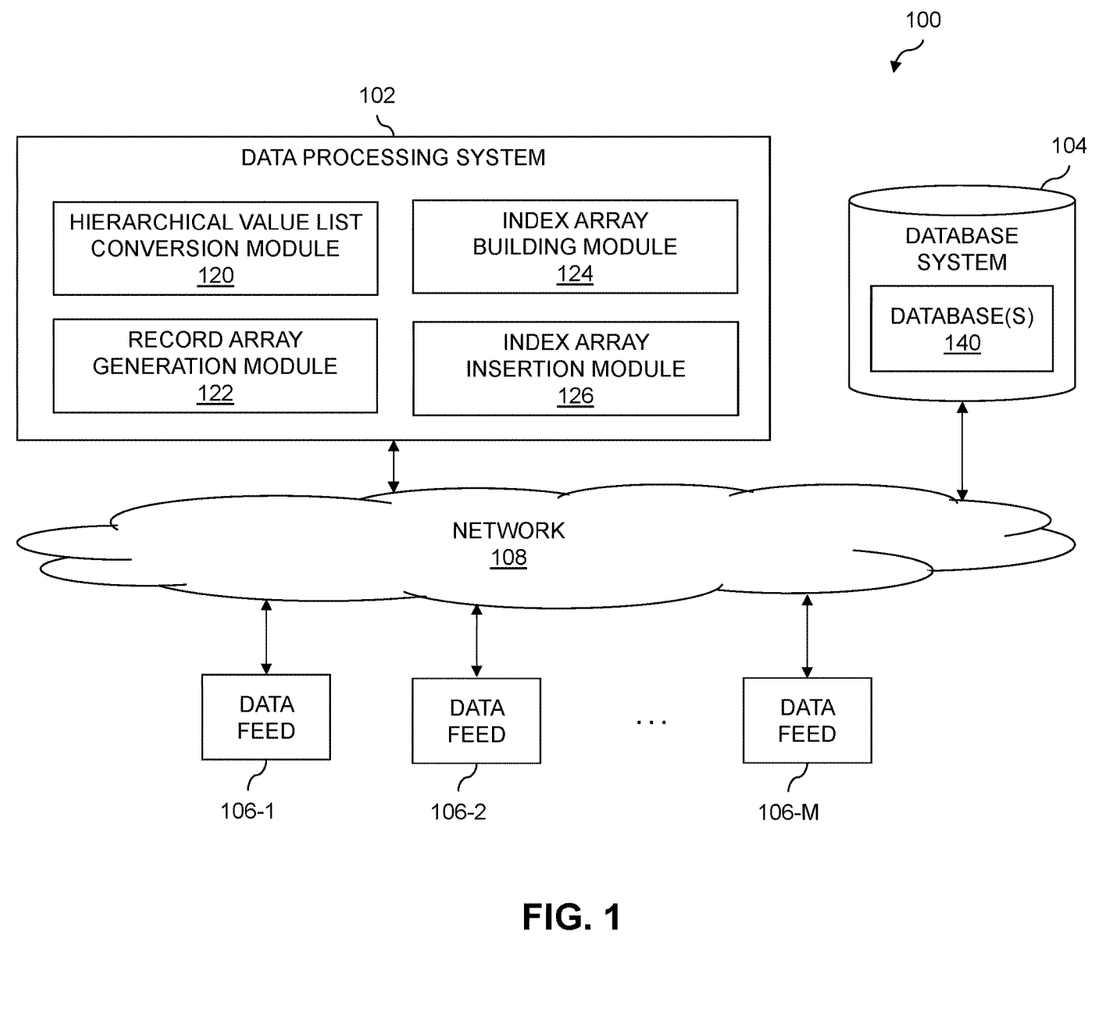
FIG. 1 is a block diagram of an information processing system for inserting datasets into database systems utilizing hierarchical value lists in an illustrative embodiment of the invention.

FIG. 1 shows an information processing system 100 configured in accordance with an illustrative embodiment. The information processing system 100 is assumed to be built on at least one processing platform and provides functionality for ingesting datasets into databases of a database system utilizing hierarchical value lists.

In this embodiment, the system 100 more particularly comprises a data processing system 102, a database system 104 and a plurality of data feeds 106-1, 106-2, . . . 106-M (collectively, data feeds 106) coupled via a network 108. The data processing system 102 is configured to obtain datasets from one or more of the data feeds 106, process such datasets into record and index arrays, and insert the datasets into one or more databases 140 of the database system 104 by processing the dataset one index array at a time (e.g., rather than record-by-record). In some embodiments, the index arrays are built "in-memory" of a main memory of the data processing system 102.

The data feeds 106, in some embodiments, may be associated with one or more physical computing devices, such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The data feeds 106 provide content that is to be stored in the databases 140 of the database system 104. In some embodiments, each of the data feeds 106 may provide such data in the form of extensible markup language (XML) documents, where an XML document includes a plurality of elements associated with a plurality of records of a dataset to be inserted into one or more of the databases 140 of the database system 104.

The network 108 is assumed to comprise a global computer network such as the Internet, although other types of networks can be part of the network 106, including a wide area network (WAN), a local area network (LAN), a satellite network, a telephone or cable network, a cellular network, a wireless network such as a WiFi or WiMAX network, or various portions or combinations of these and other types of networks.

The database system 104, as noted above, includes one or more databases 140. In some embodiments, the database system 104 includes separate databases 140 for each of the data feeds 106 (e.g., there is a one-to-one relationship between particular ones of the data feeds 106 and particular ones of the databases 140 of the database system 104). In other embodiments, a single one of the databases 140 of the database system 104 may store data from two or more of the data feeds 106. Although not shown in FIG. 1 for clarity of illustration, in some embodiments each of the databases 140 may be associated with a distinct database system, rather than the database system 104 maintaining multiple databases. Separate instances of the data processing system 102 may be associated with such different database systems, or the same data processing system may be used for multiple different database systems. Further, although shown as separate in FIG. 1, it should be appreciated that in some embodiments the data processing system 102 is implemented at least partially internal to the database system 104. In addition, one or more of the data feeds 106 may be implemented at least partially internal to one or more of the data processing system 102 and database system 104.

The database system 104 in some embodiments is implemented using one or more storage systems or devices. In some embodiments, one or more of the storage systems utilized to implement the database system 104 comprises a scale-out all-flash content addressable storage array such as an XtremIO™ storage array from Dell EMC of Hopkinton, Mass. Other types of storage arrays, including by way of example VNX® and Symmetrix VMAX® storage arrays also from Dell EMC, can be used to implement a storage system in other embodiments.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays such as Unity™ software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the data processing system 102, database system 104, data feeds 106, etc., as well as to support communication between such components and other related systems and devices not explicitly shown.

In the FIG. 1 embodiment, the data feeds 106 are assumed to comprise information that is to be inserted into one or more of the databases 140 of database system 104. As an example, the database system 104 may form part of a GRC system, such as the RSA Archer® GRC system, and the data feeds 106 may provide datasets that are to be inserted into databases maintained by the GRC system. The database system 104 may also or alternatively form a portion of a security analytics system, a security information and event management (SIEM) system, etc. Such datasets may include information associated with one or more enterprise systems (e.g., information technology (IT) infrastructure) of one or more enterprises managed using the GRC system. For example, the data feeds 106 may be associated with different enterprise systems or IT infrastructure associated with different enterprises that are managed or otherwise utilize the GRC system maintaining the database system 104 (e.g., there may be one data feed 106 per enterprise system). Alternatively, the data feeds 106 may include or provide different types of information associated with one or more of the enterprise systems. For example, different ones of the data feeds 106 may provide datasets for different types of customer-premises equipment (CPE) information for one or more enterprise systems, including but not limited to CPE hardware technology statistics and information, CPE operating system (OS) technology statistics and information, etc.

The data processing system 102 in the FIG. 1 embodiment is assumed to be implemented using at least one processing device. Each such processing device generally comprises at least one processor and an associated memory, and implements one or more functional modules for controlling certain features of the data processing system 102. The data processing system 102, in some embodiments, provides a database management system (DBMS) that provides an interface to the databases 140 of database system 104 for information storage and retrieval. In the FIG. 1 embodiment, the data processing system 102 comprises a hierarchical value list conversion module 120, a record array generation module 122, an index array building module 124, and an index array insertion module 126.

The hierarchical value list conversion module 120 is configured to obtain a dataset comprising a plurality of records to be inserted into one or more of the databases 140 of database system 104. The dataset is assumed to be obtained from one or more of the data feeds 106. The hierarchical value list conversion module 120 is further configured to convert the obtained dataset into a hierarchical value list, where the hierarchical value list comprises a hierarchy with one or more levels, possibly in the form of a tree structure.

The record array generation module 122 is configured to generate a plurality of record arrays for the plurality of records to be inserted into one or more of the databases 140 of the database system 104. Each of the record arrays may comprise a set of values for one of the plurality of records. Each value in the set of values is associated with one of the levels of the hierarchy of the hierarchical value list. For example, in a hierarchy with three levels, each record array would include three values, one for the first level of the hierarchy, one for the second level of the hierarchy, and one for the third level of the hierarchy. The set of values in a given record array are associated with respective index positions that correspond to the one or more levels in the hierarchy of the hierarchical value list.

The index array building module 124 is configured to build index arrays for each of the levels in the hierarchy of the hierarchical value list. To build the index array for a given level of the hierarchy, the index array building module 124 collects values from the plurality of record arrays in the index position corresponding to the given level of the hierarchy. For example, the top level or generation of the hierarchy may be associated with a first index position in each of the record arrays. The index array for the top level or generation of the hierarchy is thus built using values in the first index position of each of the record arrays. The index array for a next level or generation of the hierarchy is built using values in the second index position of the record arrays, and so on for each level or generation of the hierarchy.

The index array insertion module 126 is configured to insert the index arrays into one or more of the databases 140 of the database system 104. The index array insertion module 126 illustratively does so one level or generation of the hierarchy at a time (e.g., each of the index arrays is passed to the database system 104 for insertion into the one or more databases 140 one at a time, starting with the highest generation or top level of the hierarchy). Each index array is processed at one time, and the relevant identifiers are returned for each of the values in that index array.

It is to be appreciated that the particular arrangement of the data processing system 102, database system 104 and data feeds 106 illustrated in the FIG. 1 embodiment is presented by way of example only, and alternative arrangements can be used in other embodiments. As discussed above, for example, the data processing system 102, or one or more of the modules thereof, may in some embodiments by implemented internal to the database system 104. As another example, the functionality associated with the hierarchical value list conversion module 120, record array generation module 122, index array building module 124 and index array insertion module 126 may be combined into one module, or separated across more than four modules with the multiple modules possibly being implemented with multiple distinct processors or processing devices.

At least portions of the hierarchical value list conversion module 120, record array generation module 122, index array building module 124 and index array insertion module 126 may be implemented at least in part in the form of software that is stored in memory and executed by a processor.

It is to be understood that the particular set of elements shown in FIG. 1 for inserting datasets into database systems utilizing hierarchical value lists is presented by way of illustrative example only, and in other embodiments additional or alternative elements may be used. Thus, another embodiment may include additional or alternative systems, devices and other network entities, as well as different arrangements of modules and other components.

The data processing system 102 and other portions of the system 100, as will be described in further detail below, may be part of cloud infrastructure such as an Amazon Web Services (AWS) system. Other examples of cloud-based systems that can be used to provide the data processing system 102 include Virtustrearn Enterprise Cloud, Virtustrearn Storage Cloud, Google Cloud Platform (GCP) and Microsoft Azure.

The data processing system 102 and other components of the information processing system 100 in the FIG. 1 embodiment are assumed to be implemented using at least one processing platform each comprising one or more processing devices each having a processor coupled to a memory. Such processing devices can illustratively include particular arrangements of compute, storage and network resources.

The data processing system 102 and the database system 104 may in some embodiments be implemented on respective distinct processing platforms, although numerous other arrangements are possible. For example, in some embodiments at least portions of the data processing system 102 and the database system 104 are implemented on the same processing platform.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the data processing system 102 and database system 104, or portions or components thereof, to reside in different data centers. Numerous other distributed implementations are possible. The data processing system 102 can also be implemented in a distributed manner across multiple data centers.

Additional examples of processing platforms utilized to the data processing system 102 and other components of the information processing system 100 in illustrative embodiments will be described in more detail below in conjunction with FIGS. 4 and 5.

It is to be appreciated that these and other features of illustrative embodiments are presented by way of example only, and should not be construed as limiting in any way.

An exemplary process for inserting a dataset into a database of a database system utilizing a hierarchical value list will now be described in more detail with reference to the flow diagram of FIG. 2. It is to be understood that this particular process is only an example, and that additional or alternative processes for utilizing hierarchical value lists to insert datasets into a database can be carried out in other embodiments.

In this embodiment, the process includes steps 200 through 208. These steps are assumed to be performed by the data processing system 102 utilizing the hierarchical value list conversion module 120, record array generation module 122, index array building module 124 and index array insertion module 126. The process begins with step 200, obtaining a dataset comprising a plurality of records to be inserted into a database. In some embodiments, step 200 includes receiving one or more data feeds. A data feed may comprise an XML document that includes a plurality of elements each associated with one of a plurality of records of the dataset. A given one of the elements associated with a given one of the records may comprise a set of nodes that correspond to values of the given record for one or more levels of a hierarchy. The set of nodes may also include at least one node that is not associated with one of the levels of the hierarchy.

In step 202, the dataset is converted into a hierarchical value list comprising a hierarchy with one or more levels. The hierarchy may comprise a multi-level tree structure comprising two or more levels, and step 202 may include associating portions of the plurality of records to values in the two or more levels of the multi-level tree structure.

The plurality of records may comprise various types of information. In some embodiments, for example, the records are geographical addresses, and the hierarchy of the hierarchical value list may comprise a first level for country, a second level for state or province, a third level for city, etc. In other embodiments, the records may be personnel records denoting a user's position in an organizational structure of an enterprise, with levels of the hierarchy corresponding to the enterprise, business units thereof, positions at the business units, etc. In other embodiments, the records may include asset records for assets of an enterprise, such as servers or other processing devices in IT infrastructure, with levels of the hierarchy corresponding to the enterprise, different data centers thereof, etc. The levels of the hierarchy may also correspond to different aspects of the assets, such as hardware or software thereof (e.g., manufacturers or suppliers of various hardware and software components of the assets, etc.). It should be appreciated that the above types of records are provided by way of example only, and that embodiments are not limited to use with the ingestion of any particular type of records.

In step 204, a plurality of record arrays are generated for the plurality of records to be inserted into the database. Each record array corresponds to one of the plurality of records and comprises a set of values for a given one of the records at one or more index positions corresponding to the one or more levels of the hierarchy. Continuing with the example of geographic address records described above, each record array may include a first index position with the value for the country in the given record, a second index position with the value for the state or province in the given record, a third position with the value for the city in the given record, etc.

Figure 2:
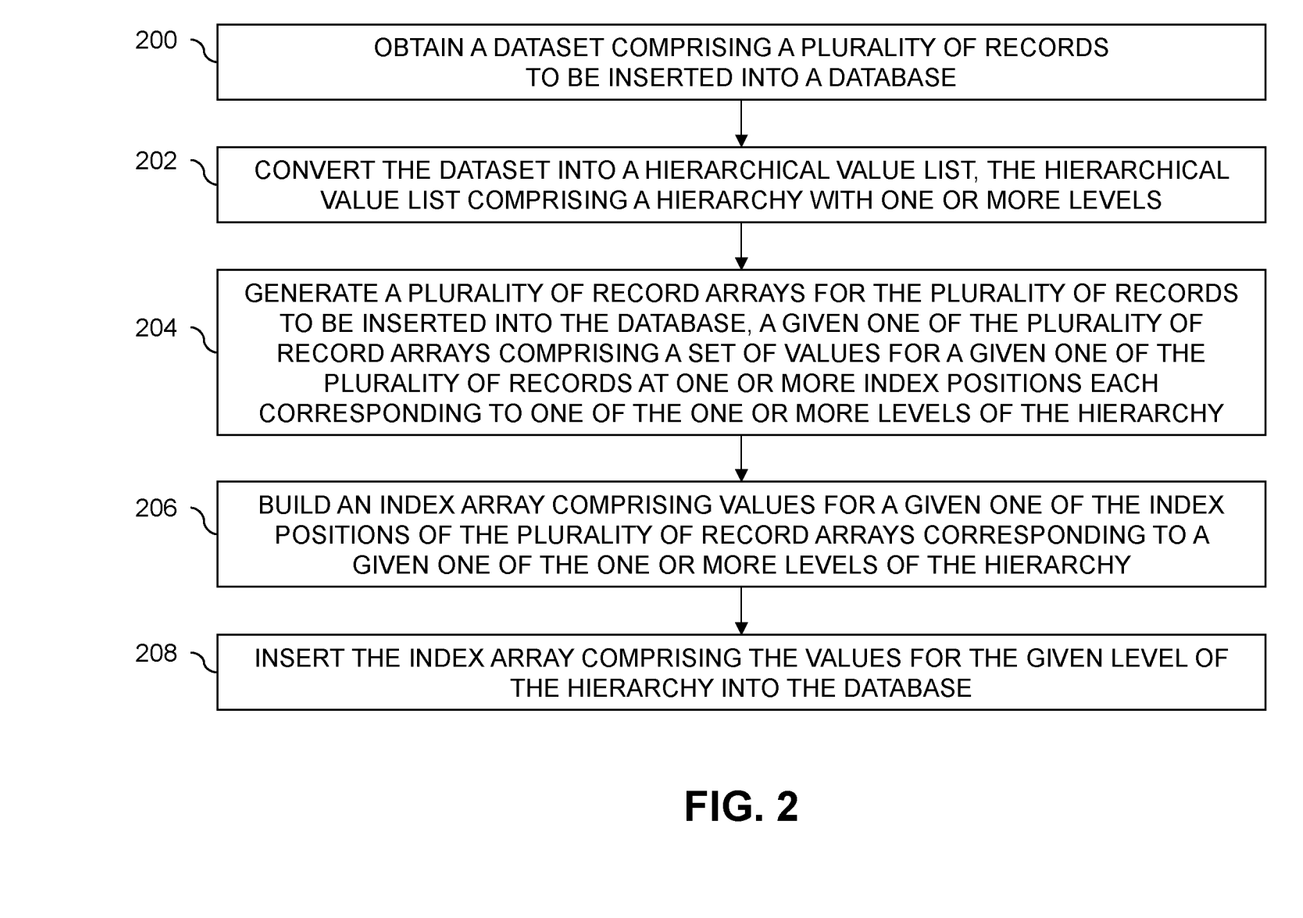
FIG. 2 is a flow diagram of an exemplary process for inserting a dataset into a database system utilizing a hierarchical value list in an illustrative embodiment.

The FIG. 2 process continues with building an index array comprising values for a given one of the index positions of the plurality of record arrays corresponding to a given one of the one or more levels of the hierarchy in step 206. In step 208, the index array is inserted into the database. Steps 206 and 208 may be repeated for one or more additional index arrays for one or more additional ones of the index positions corresponding to one or more additional levels of the hierarchy. The multiple iterations of steps 206 and 208 may start with a top or highest level or generation in the hierarchy, and proceed with subsequent levels in turn. Again continuing with the example of geographical address records, the first iteration of steps 206 and 208 includes building and inserting an index array for the first index position corresponding to country, followed by a second iteration of steps 206 and 208 that includes building and inserting an index array for the second index position corresponding to state or province, followed by a third iteration of steps 206 and 208 that includes building and inserting an index array for the third index position corresponding to city, etc. In this manner, the dataset is inserted into the database by processing each of the one or more levels of the hierarchy in turn to return identifiers for values in each of the one or more levels one at a time, rather than processing each of the plurality of records to return identifiers for values of each of the plurality of records one at a time.

In some embodiments, step 208 includes, for a given value of the index array, determining if the given value is present in the database. If the given value is already present in the database, a name and identifier for the given value is returned. If the given value is not present (e.g., missing) from the database, the given value is inserted into the database by assigning an identifier to the name of the given value and returning the name and the assigned identifier for the given value. Determining if the given value is present in the database may comprise matching a value of an additional index position for the given record in the database, the additional index position corresponding to a parent node of the given index position in the multi-level tree structure.

In a data feed, each record of content may be an element of an XML document. The values of the hierarchical value list may be contained in XML nodes within each element. Several other non-value list nodes may also exist for each content element. As each element in the XML document is processed, the value of the hierarchical value list is searched in the database using the name of the value and the name of the parent (e.g., if a parent is listed). If the value is found, an associated identifier replaces the name value in the content. If the value is not found, the value is inserted into the database and assigned an identifier, with the assigned identifier being returned and used to replace the name value in the content. This process may be repeated for each value within that node and for each value list node within the content. Thus, for a data feed with 30,000 pieces of content with each piece of content containing one value list field, there is a minimum of 30,000 select calls from the database. If there are 100 new values found amongst the 30,000, then there will be 100 insert calls to the database.

Consider, as an example, the following set of three records that are part of a data feed to be ingested or inserted into a database: (i) [US][KS][Overland Park]; (ii) [US][GA][Atlanta]; and (iii) [US][KS][Gardner]. Each record includes address information (with a value list name containing a full path to root) including a country (e.g., US for United States), a state (e.g., KS for Kansas, GA for Georgia) and a city (e.g., Overland Park, Atlanta, Gardner). Assume that the database currently has no stored values for these records. The process for ingesting these records into the database will thus proceed as follows:

For record (i), the value of US is looked up, not found and then inserted. The value KS (with US as the parent) is looked up, not found, and then inserted. The value Overland Park (with KS as the parent) is looked up, not found, and then inserted.

For record (ii), the value of US is looked up, found, and its identifier is returned. The value GA (with US as the parent) is looked up, not found and then inserted. The value Atlanta (with GA as the parent) is looked up, not found and then inserted.

For record (iii), the value of US is looked up, found, and its identifier is returned. The value KS (with US as the parent) is looked up, found, and its identifier is returned. The value Gardner (with KS as the parent) is looked up, not found, and then inserted.

As can be seen, each record is processed in essence with three steps (e.g., one for each level or generation of the hierarchical value list). To process 19,000 incorporated US areas (each including a city, state and country) would therefore require 57,000 steps.

In some embodiments, a hierarchical value list is ingested by making a full pass over the content to be ingested, followed by building the hierarchical value list as one or more in-memory index arrays (e.g., one for each level or generation of the hierarchical value list). It should be noted that this may be done even if the "tree" or hierarchy has only one level. Generations or levels of the tree or hierarchy are processed, and identifiers are returned from a database one generation at a time. Consider again the set of three records (i)-(iii) discussed above. The elements of these records are gathered in index arrays for each of the three levels or generations of the hierarchical value list (e.g., country, state and city): 0[US]; 1[KS][GA]; 2[Overland Park][Atlanta][Gardner].

In a loop, each generation is inserted into the database (e.g., starting with generation 0 or the highest or most broad level of the hierarchical value list). The database inserts any missing entries, and returns the identifier and name for every value. The parent name is matched to assign a parent identifier for the next generation. The loop then proceeds for subsequent generations. Once all generations have been processed, the entire hierarchical value list is ingested or inserted into the database. In this example, the hierarchical value list would be inserted into the database in three steps (e.g., one for each of generations 0, 1 and 2). It should be noted that, regardless of the amount of records, the number of steps would be the same. For example, to ingest a hierarchical value list for processing records with 19,000 incorporated United States areas (e.g., denoted by country, state and city), only three steps would be required.

This results in significant improvements to the functioning of the database system, in that less time and fewer computational resources are required for ingestion of datasets to the database. For example, given a hierarchical value list with CPE hardware technologies statistics containing 3,454 values, a conventional record-by-record ingestion approach may average the creation of 7.8 values per second and take a total of 5.5 minutes. Using approaches for level-by-level or generation-by-generation ingestion described herein, this may be improved to 67.94 database values per second taking a total of 0.8 minutes. As another example, given a hierarchical value list with CPE OS technologies statistics containing 22,417 values, the conventional record-by-record approach may average the creation of 0.71 database values per second and take a total of 426 minutes. Using approaches for level-by-level or generation-by-generation ingestion described herein, this may be improved to 22.53 database values per second taking a total of 13.8 minutes.

Figure 3A:
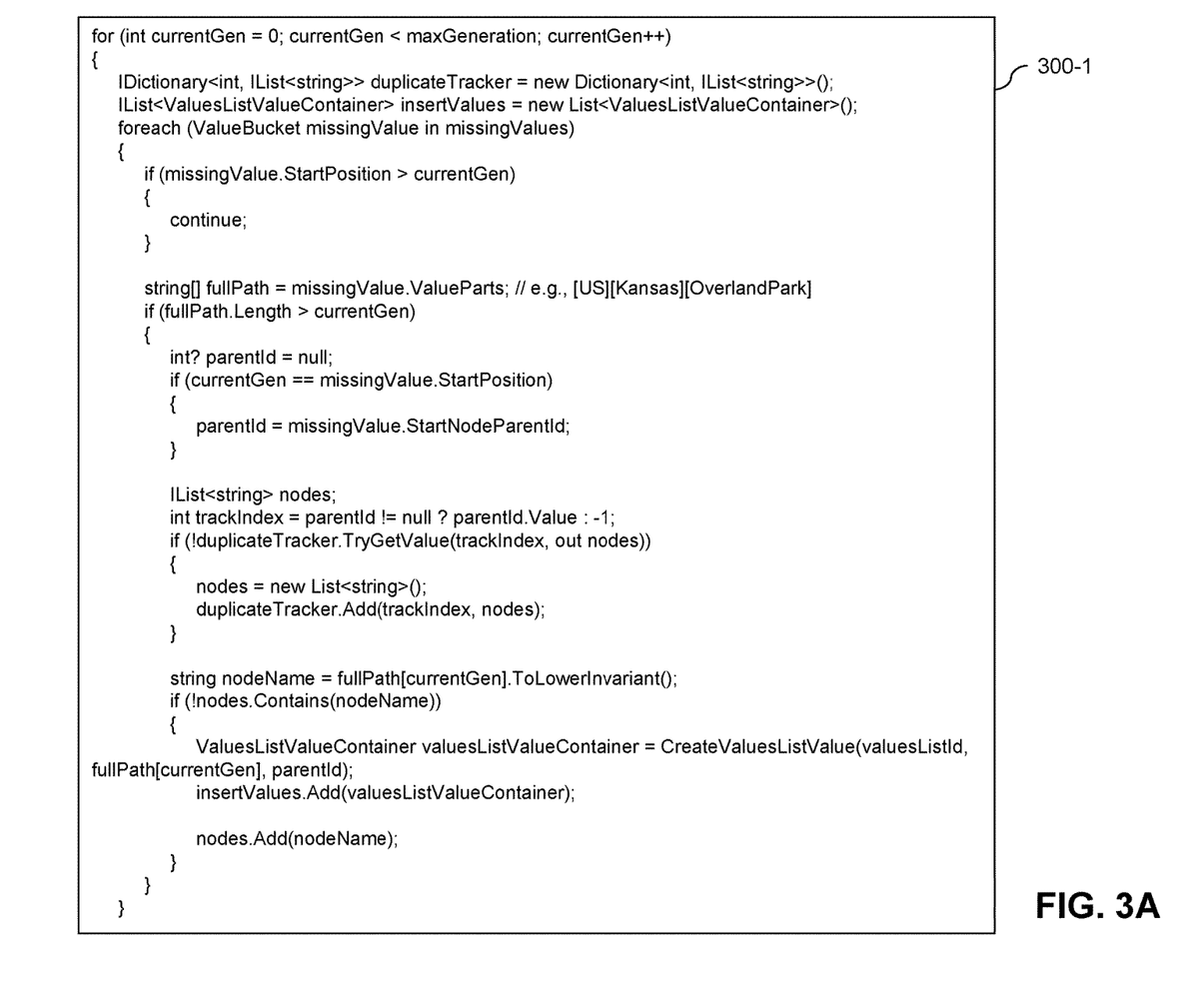
FIGS. 3A and 3B show pseudocode for inserting a dataset into a database system utilizing a hierarchical value list in an illustrative embodiment.
Figure 3B:
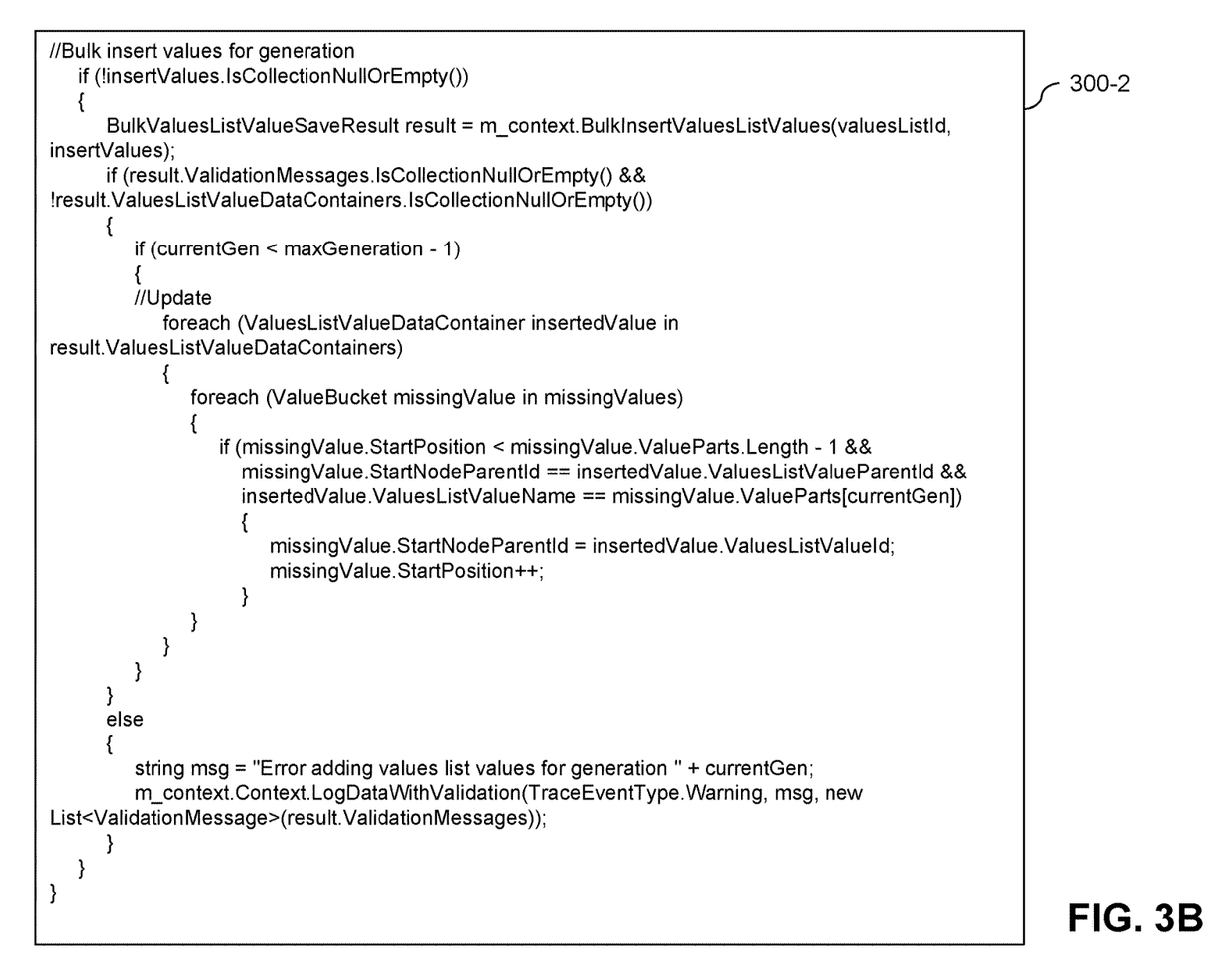

FIGS. 3A and 3B illustrate pseudocode 300-1 and 300-2, respectively (collectively, pseudocode 300) for implementing hierarchical value list ingestion to a database where each level of the hierarchical value list is inserted at once rather than record-by-record.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for inserting datasets into a database system utilizing hierarchical value lists will now be described in greater detail with reference to FIGS. 4 and 5. Although described in the context of system 100, these platforms may also be used to implement at least portions of other information processing systems in other embodiments.

Figure 4:
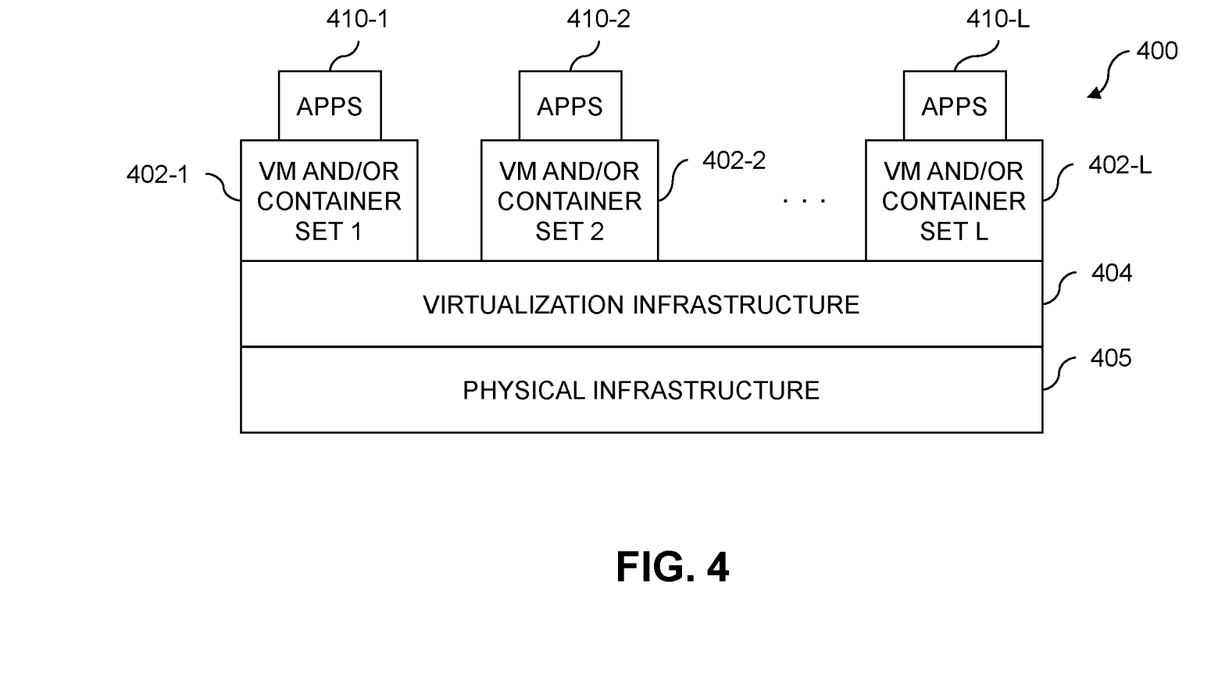
FIGS. 4 and 5 show examples of processing platforms that may be utilized to implement at least a portion of an information processing system in illustrative embodiments.
Figure 5:
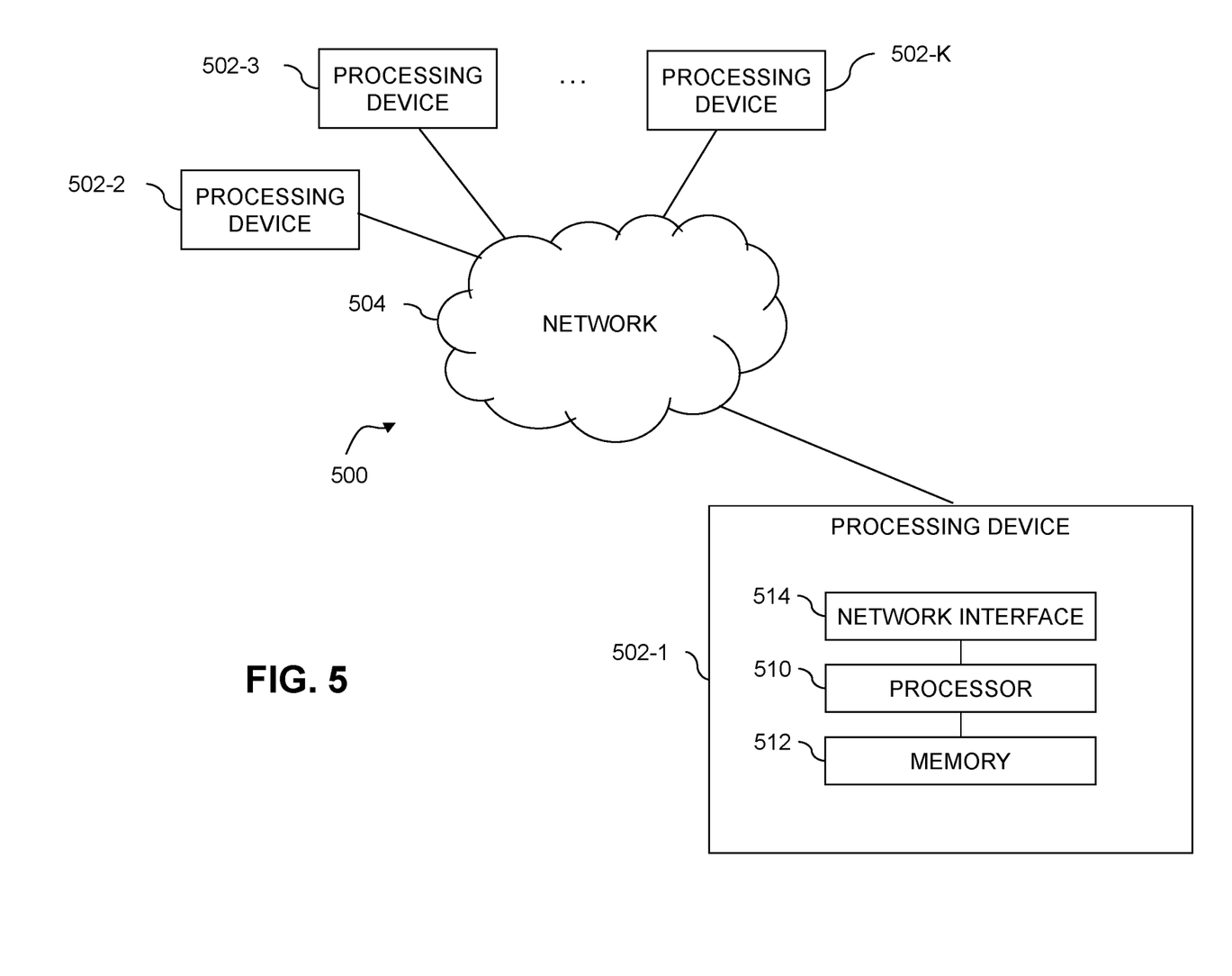

FIG. 4 shows an example processing platform comprising cloud infrastructure 400. The cloud infrastructure 400 comprises a combination of physical and virtual processing resources that may be utilized to implement at least a portion of the information processing system 100. The cloud infrastructure 400 comprises multiple virtual machines (VMs) and/or container sets 402-1, 402-2, . . . 402-L implemented using virtualization infrastructure 404. The virtualization infrastructure 404 runs on physical infrastructure 405, and illustratively comprises one or more hypervisors and/or operating system level virtualization infrastructure. The operating system level virtualization infrastructure illustratively comprises kernel control groups of a Linux operating system or other type of operating system.

The cloud infrastructure 400 further comprises sets of applications 410-1, 410-2, . . . 410-L running on respective ones of the VMs/container sets 402-1, 402-2, . . . 402-L under the control of the virtualization infrastructure 404. The VMs/container sets 402 may comprise respective VMs, respective sets of one or more containers, or respective sets of one or more containers running in VMs.

In some implementations of the FIG. 4 embodiment, the VMs/container sets 402 comprise respective VMs implemented using virtualization infrastructure 404 that comprises at least one hypervisor. An example of a hypervisor platform that may be used to implement a hypervisor within the virtualization infrastructure 404 is the VMware® vSphere® which may have an associated virtual infrastructure management system such as the VMware® vCenter™. The underlying physical machines may comprise one or more distributed processing platforms that include one or more storage systems.

In other implementations of the FIG. 4 embodiment, the VMs/container sets 402 comprise respective containers implemented using virtualization infrastructure 404 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 400 shown in FIG. 4 may represent at least a portion of one processing platform. Another example of such a processing platform is processing platform 500 shown in FIG. 5.

The processing platform 500 in this embodiment comprises a portion of system 100 and includes a plurality of processing devices, denoted 502-1, 502-2, 502-3, . . . 502-K, which communicate with one another over a network 504.

The network 504 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 502-1 in the processing platform 500 comprises a processor 510 coupled to a memory 512.

The processor 510 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 512 may comprise random access memory (RAM), read-only memory (ROM), flash memory or other types of memory, in any combination. The memory 512 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 502-1 is network interface circuitry 514, which is used to interface the processing device with the network 504 and other system components, and may comprise conventional transceivers.

The other processing devices 502 of the processing platform 500 are assumed to be configured in a manner similar to that shown for processing device 502-1 in the figure.

Again, the particular processing platform 500 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™ or Vblock® converged infrastructure from Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for inserting datasets into a database system utilizing hierarchical value lists as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, databases, data feeds, record types, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:
obtaining a dataset comprising a plurality of records to be inserted into a database;
converting the dataset into a hierarchical value list, the hierarchical value list comprising a hierarchy with one or more levels;
generating a plurality of record arrays for the plurality of records to be inserted into the database, a given one of the plurality of record arrays comprising a set of values for a given one of the plurality of records at one or more index positions each corresponding to one of the one or more levels of the hierarchy;
building an index array comprising values for a given one of the index positions of the plurality of record arrays corresponding to a given one of the one or more levels of the hierarchy; and
inserting the index array comprising the values for the given level of the hierarchy into the database;
wherein inserting the index array comprises returning identifiers for values of each of the plurality of records at the given index position corresponding to the given level of the hierarchy; and wherein the method is performed by at least one processing device comprising a processor coupled to a memory.

2. The method of claim 1 further comprising repeating the building and inserting for one or more additional index arrays for one or more additional ones of the index positions corresponding to one or more additional levels of the hierarchy.

3. The method of claim 2 wherein the given index position corresponds to a highest level of the hierarchy not yet inserted into the database.

4. The method of claim 1 wherein the hierarchy comprises a multi-level tree structure comprising two or more levels, and converting the dataset to the hierarchical value list comprises associating portions of the plurality of records to values in the two or more levels of the multi-level tree structure.

5. The method of claim 4 wherein inserting the index array comprises:
for a given value of the index array, determining if the given value is present in the database;
responsive to the given value of the index array being present in the database, returning a name and identifier for the given value; and
responsive to the given value of the index array being missing from the database, inserting the given value into the database by assigning an identifier to the name of the given value and returning the name and the assigned identifier for the given value.

6. The method of claim 5 wherein determining if the given value is present in the database comprises matching a value of an additional index position for the given record in the database, the additional index position corresponding to a parent node of the given index position in the multi-level tree structure.

7. The method of claim 1 wherein the plurality of records in the dataset comprise geographical addresses, and wherein the hierarchy of the hierarchical value list comprises a first level for country, a second level for state or province, and a third level for city.

8. The method of claim 1 wherein the dataset is inserted into the database by processing each of the one or more levels of the hierarchy in turn to return identifiers for values in each of the one or more levels one level at a time rather than processing each of the plurality of records to return identifiers for values of each of the plurality of records one record at a time.

9. The method of claim 1 wherein obtaining the dataset comprises receiving one or more data feeds.

10. The method of claim 9 wherein a given one of the data feeds comprises an extensible markup language (XML) document comprising a plurality of elements, each of the plurality of records being associated with one of the plurality of elements of the XML document.

11. The method of claim 10 wherein a given one of the plurality of elements associated with a given one of the plurality of records comprises a set of nodes corresponding to values for the one or more levels of the hierarchy.

12. The method of claim 11 wherein the set of nodes comprises at least one node not associated with one of the levels of the hierarchy.

13. A computer program product comprising a non-transitory processor-readable storage medium having stored therein program code of one or more software programs, wherein the program code when executed by at least one processing device causes the at least one processing device:

to obtain a dataset comprising a plurality of records to be inserted into a database;
to convert the dataset into a hierarchical value list, the hierarchical value list comprising a hierarchy with one or more levels;
to generate a plurality of record arrays for the plurality of records to be inserted into the database, a given one of the plurality of record arrays comprising a set of values for a given one of the plurality of records at one or more index positions each corresponding to one of the one or more levels of the hierarchy;
to build an index array comprising values for a given one of the index positions of the plurality of record arrays corresponding to a given one of the one or more levels of the hierarchy; and
to insert the index array comprising the values for the given level of the hierarchy into the database;
wherein inserting the index array comprises returning identifiers for values of each of the plurality of records at the given index position corresponding to the given level of the hierarchy.

14. The computer program product of claim 13 wherein the program code when executed by the at least one processing device further causes the at least one processing device to repeat the building and inserting for one or more additional index arrays for one or more additional ones of the index positions corresponding to one or more additional levels of the hierarchy, and wherein the given index position corresponds to a highest level of the hierarchy not yet inserted into the database.

15. The computer program product of claim 13 wherein the dataset is inserted into the database by processing each of the one or more levels of the hierarchy in turn to return identifiers for values in each of the one or more levels one level at a time rather than processing each of the plurality of records to return identifiers for values of each of the plurality of records one record at a time.

16. The computer program product of claim 13 wherein obtaining the dataset comprises receiving one or more data feeds, a given one of the data feeds comprising an extensible markup language (XML) document comprising a plurality of elements, each of the plurality of records being associated with one of the plurality of elements of the XML, document, a given one of the plurality of elements associated with a given one of the plurality of records comprising a set of nodes corresponding to values for the one or more levels of the hierarchy.

17. An apparatus comprising:
at least one processing device comprising a processor coupled to a memory;
the at least one processing device being configured:
to obtain a dataset comprising a plurality of records to be inserted into a database;
to convert the dataset into a hierarchical value list, the hierarchical value list comprising a hierarchy with one or more levels;
to generate a plurality of record arrays for the plurality of records to be inserted into the database, a given one of the plurality of record arrays comprising a set of values for a given one of the plurality of records at one or more index positions each corresponding to one of the one or more levels of the hierarchy;
to build an index array comprising values for a given one of the index positions of the plurality of record arrays corresponding to a given one of the one or more levels of the hierarchy; and to insert the index array comprising the values for the given level of the hierarchy into the database;
wherein inserting the index array comprises returning identifiers for values of each of the plurality of records at the given index position corresponding to the given level of the hierarchy.

18. The apparatus of claim 17 wherein the at least one processing device is further configured to repeat the building and inserting for one or more additional index arrays for one or more additional ones of the index positions corresponding to one or more additional levels of the hierarchy, and wherein the given index position corresponds to a highest level of the hierarchy not yet inserted into the database.

19. The apparatus of claim 17 wherein the dataset is inserted into the database by processing each of the one or more levels of the hierarchy in turn to return identifiers for values in each of the one or more levels one level at a time rather than processing each of the plurality of records to return identifiers for values of each of the plurality of records one record at a time.

20. The apparatus of claim 17 wherein obtaining the dataset comprises receiving one or more data feeds, a given one of the data feeds comprising an extensible markup language (XML) document comprising a plurality of elements, each of the plurality of records being associated with one of the plurality of elements of the XML document, a given one of the plurality of elements associated with a given one of the plurality of records comprising a set of nodes corresponding to values for the one or more levels of the hierarchy.

\* \* \* \* \*